United States Patent [19]

Brown

[11] 4,188,252

[45] Feb. 12, 1980

[54] LABEL POSITIONING AND APPLYING APPARATUS

[75] Inventor: Frank H. Brown, Norwich, N.Y.

[73] Assignee: Automecha Ltd., Oxford, N.Y.

[21] Appl. No.: 829,516

[22] Filed: Aug. 31, 1977

[51] Int. Cl.² .............................................. B32B 31/00

[52] U.S. Cl. .................................... 156/361; 156/542; 271/267

[58] Field of Search ............... 156/350, 351, 361, 540, 156/542; 271/267, 136; 226/90-91

[56] References Cited

U.S. PATENT DOCUMENTS

| | | | |
|---|---|---|---|
| 3,312,463 | 4/1967 | Vantloose et al. | 271/267 X |
| 3,578,316 | 5/1971 | Watson et al. | 271/267 |
| 3,721,601 | 3/1973 | Pituch et al. | 156/542 |
| 3,779,829 | 12/1973 | Wolff | 156/361 |
| 3,907,626 | 9/1975 | Cook | 186/361 |
| 3,928,115 | 12/1975 | Kerwin | 156/542 X |
| 4,080,239 | 3/1978 | Real et al. | 156/542 X |
| 4,082,595 | 4/1978 | Slater | 186/542 |

*Primary Examiner*—David A. Simmons
*Attorney, Agent, or Firm*—Shoemaker and Mattare, Ltd.

[57] ABSTRACT

A label applying machine in which envelopes or the like are fed past a label affixing station and a web carrying labels is advanced in stepped incremental movements past the station to affix the labels to the envelopes or the like in predetermined, timed, spaced relationship, the machine including sensing means for sensing the positions of the labels and envelopes or the like and having electronic controls for adjusting the positions to obtain accurate registry between the labels and envelopes or the like.

9 Claims, 18 Drawing Figures

FIG. 9.
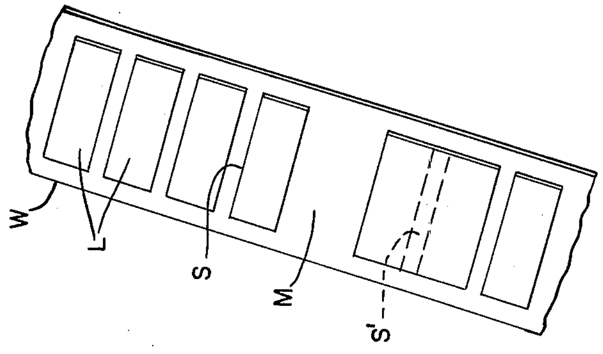
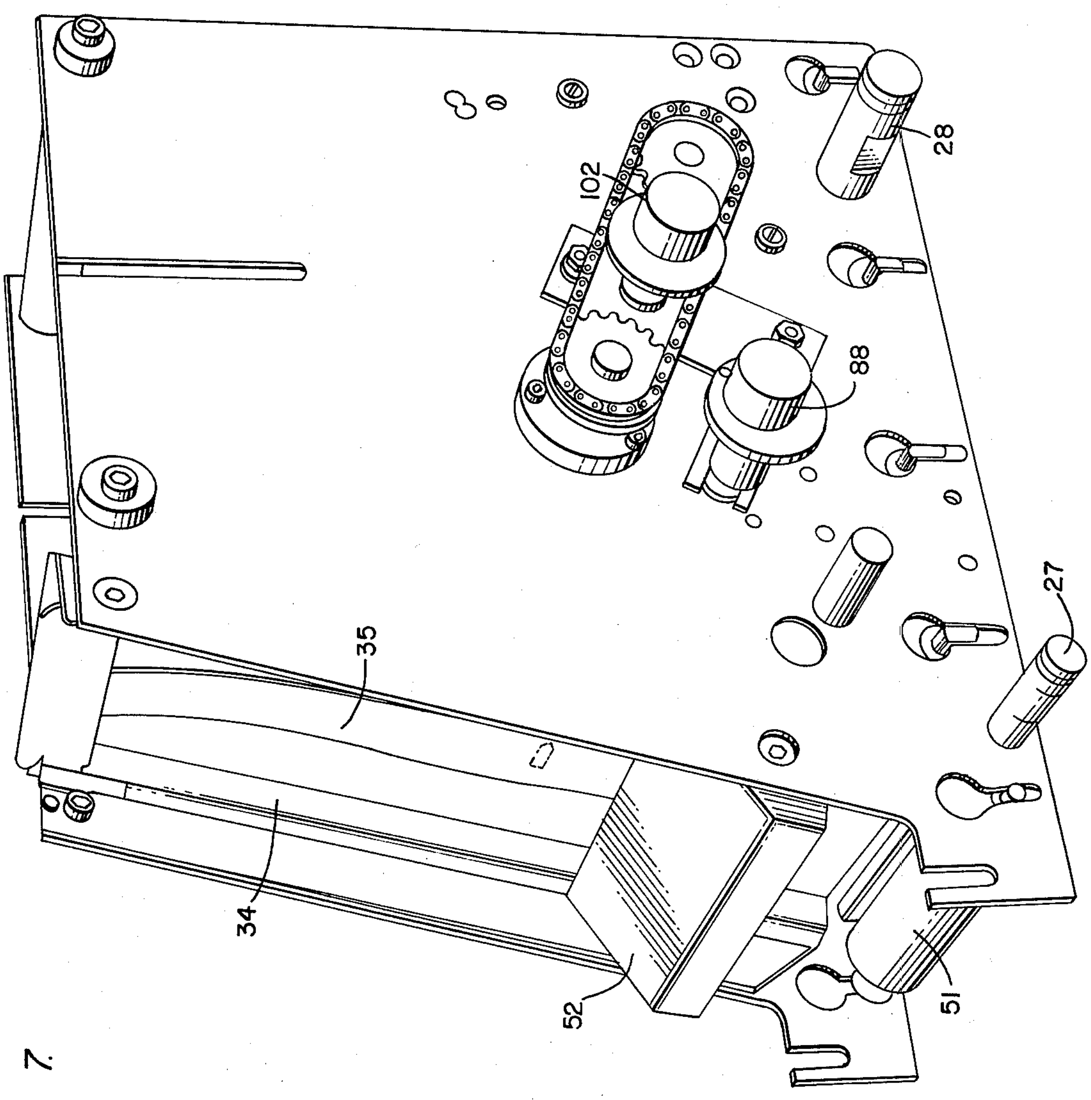
FIG. 7.

LABEL POSITIONING AND APPLYING APPARATUS

BACKGROUND OF THE INVENTION

This invention relates to apparatus for applying labels to envelopes or the like, and more particularly, relates to such apparatus wherein the timing of the movement of the labels and envelopes past a label affixing station is controlled electronically, thus eliminating the need for sprocket wheels and the like and also obtaining a greater degree of accuracy and resulting in more simple, economical equipment.

Labeling machines are known in the prior art for affixing labels to envelopes and the like, but such labeling machines usually employ sprocket wheels or the like to obtain registry between a web carrying labels and envelopes fed past a label affixing station. Such prior art apparatus is relatively complex mechanically and has limited durability and reliability. Moreover, the labels are sometimes irregularly spaced on the web as, for example, would occur when a label is missing or when the space between adjacent labels is filled with improperly removed material during manufacture of the label web. The primary difficulty, however, with prior art labeling machines is their relatively complex mechanisms and high costs.

The labeler in accordance with the present invention, on the other hand, provides a relatively simple and economical labeling machine in which electronic control means regulates the timing and positioning of the labels and envelopes to obtain accurate registration therebetween. Moreover, the control means includes circuitry for compensating for missing labels on the label carrying web or other irregularities therein, whereby accurate registration is maintained for subsequent labels fed to the label affixing station. Similarly, the electronic circuitry can be easily and readily adjusted to vary the positioning of labels applied to the envelopes or the like to suit the needs of a particular user of the machine.

Further, the labeling machine of the present invention is usable with various other types of equipment, such as envelope feeders, sheet folders, and runout cabinets and the like, whereby the labeler of the present invention may be installed in combination with various pieces of such equipment to obtain a continuous operation. Additionally, the labeling machine of the present invention is exceptionally versatile, being capable of handling pieces from 3"×5" up to 9"×12", and is capable of applying labels to pieces at the rate of up to 8,500 pieces per hour. Moreover, it operates on conventional 115 volt, 60 cycle alternating current.

OBJECTS OF THE INVENTION

Accordingly, it is an object of this invention to provide a labeling machine for advancing a web carrying labels and a plurality of pieces to have the labels affixed thereto past a label affixing station in predetermined, timed relationship, whereby the labels are applied to the pieces in proper registration therewith, and wherein control of the positioning of the labels and pieces is accomplished electronically.

Another object of the invention is to provide a labeling machine which advances labels and pieces to which the labels are to be affixed past a labeling station, with the advancement of the labels and pieces being controlled electronically, and wherein the machine is simple in construction and low in cost.

A further object of the invention is to provide a labeling machine which advances a web carrying labels past a label affixing station for removal of the labels from the web and attachment of the labels to envelopes of the like, and wherein the web with labels removed therefrom is fed through a chute structure to a takeup roll, the chute structure including novel means for positioning it to enable easy threading of the web into the machine at the beginning of a labeling operation.

A still further object of the invention is to provide a label applying machine in which a web carrying labels is advanced past a label affixing station in stepped incremental movements timed with movement of envelopes or the like past the station, wherein the labels are applied in accurately positioned relationship on the envelopes or the like, and wherein positioning of the labels relative to the envelopes or the like is accomplished with electronic circuitry, said circuitry including means for introducing a delay into the label feeding apparatus to prevent inaccuracies due to a missing label or the like on the label carrying web.

BRIEF DESCRIPTION OF THE DRAWINGS

FIG. 7 is an enlarged, perspective view of the labeling machine of FIG. 1, with the cover or housing removed.

FIG. 9 is an enlarged, fragmentary, perspective view of a portion of a web carrying labels for use with the labeling machine of FIG. 7.

FIG. 13 is an enlarged, fragmentary view in section of the portion of the labeling machine where labels are attached to envelopes or the like, and showing the web being moved past the label stripping bar with a label just being separated from the web and about to be applied to an envelope or the like.

DETAILED DESCRIPTION OF THE INVENTION

Figure 1:
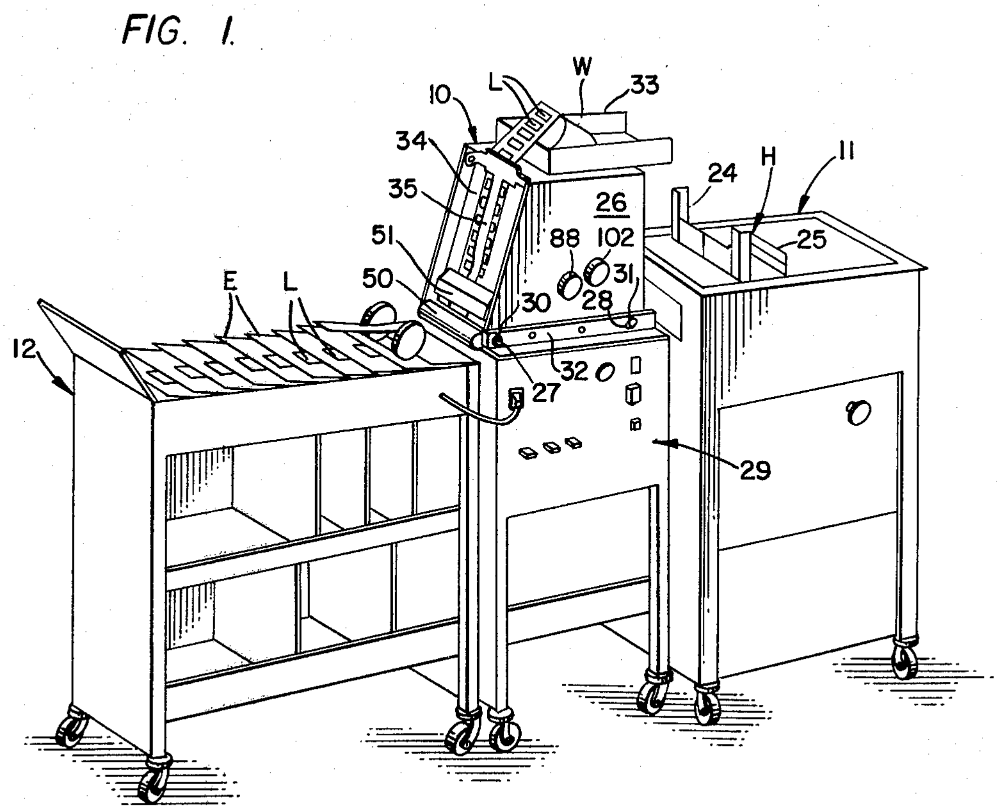
FIG. 1 is a front perspective view of an apparatus embodying the label applying machine of the present invention, wherein the label applying machine is shown in association with an envelope feeder and a runout or receiving cabinet.

In the drawings, wherein like reference numerals indicate like parts throughout the several views, a labeling machine according to the invention is indicated generally at 10 in FIG. 1 and is shown disposed in operative association with a feeder 11 for holding and feeding a supply of envelopes or the like to the labeling machine 10 and a runout or receiving cabinet or tray 12 for receiving pieces such as envelopes or the like E from the labeling machine with labels L affixed thereto.

Figure 2:
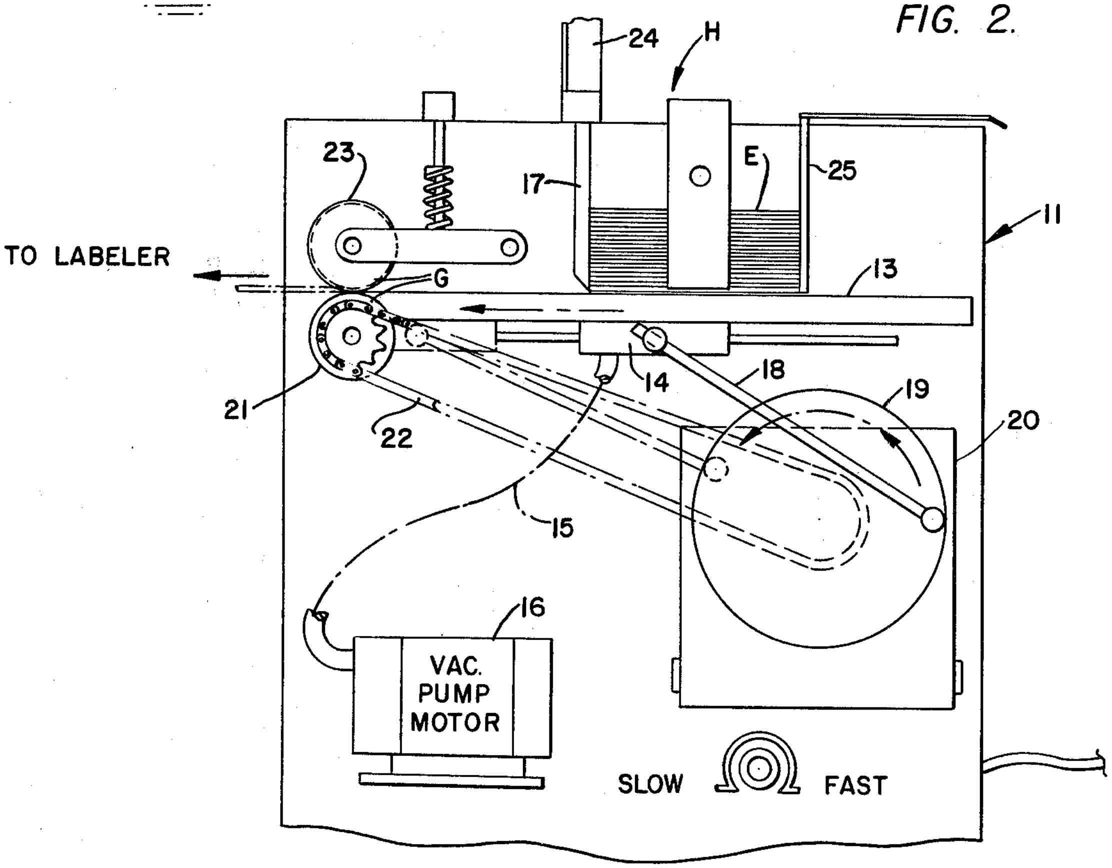
FIG. 2 is a somewhat diagrammatic, enlarged, fragmentary view, with portions broken away, of the feeder of FIG. 1.

As seen in FIG. 2, the feeder 11 includes a hopper H in which a supply of envelopes E or other pieces to be labeled are stacked. A vacuum table or shuttle 13 is reciprocably mounted beneath the hopper H and is of hollow construction and has a plurality of openings in the top surface thereon in registry with the hopper H when the shuttle is in the position shown in FIG. 2. The shuttle is connected via a manifold 14 and flexible vacuum line 15 with a suitable source of vacuum such as vacuum pump motor 16, whereby a vacuum or suction is created at the openings in the top surface of the shuttle 13. The vacuum thus created serves to draw the bottommost envelope in the stack of envelopes in the hopper downwardly onto the shuttle, pulling the forward edge thereof beneath the lower edge of stop 17, whereby a single envelope is retained on the shuttle 13 during each forward stroke or motion thereof as controlled by the pitman 18 connected with wheel 19 driven from motor 20. A feed roll 21 is driven by means of a chain or the like 22 from the same motor 20 and cooperates with a second roll 23, through a gear drive G, for gripping the envelope E at the forward limit of travel of shuttle 13 and feeding the envelope into the rear portion of the labeling machine 10.

The arrangement is such that there are no valves or other mechanisms used to interrupt the vacuum to the shuttle 13 or perform other operations thereon. The bottommost envelope in the stack of envelopes is simply drawn onto the shuttle by the vacuum and held thereon until the forward edge of the envelope is extended between the feed rolls 21 and 23, whereby the feed rolls strip the envelope from the shuttle as the shuttle begins its return movement to a position beneath the hopper to pick up another envelope. The structure is thus very simple and economical in construction as compared with prior art devices. Moreover, the positions of guides 24 and 25 at the front, sides and back of the hopper H can be laterally and longitudinally adjusted to accommodate different sizes of pieces to be handled by the machine.

The labeler 10 includes a housing or cover 26 and has a pair of outwardly projecting support rods or bars 27 and 28 at the front and rear ends, respectively, of the machine for supporting the machine on a suitable cabinet or the like 29. The support bars 27 and 28 are engaged in slots 30 and 31 formed in the upper edge of upstanding flanges or plates 32 on the top of the cabinet 29. Other suitable means of supporting the labeling machine 10 on the cabinet 29 or on another supporting surface may be provided, if desired. A tray 33 for holding a folded web W carrying the labels L is supported on top of the machine 10 and the web W is fed down an inclined face or chute 34 at the front of the machine and is held against the face by a leaf spring member 35 supported from the housing near the top of the chute. The cabinet 29 also supports means for feeding the envelopes E or other pieces to which labels are to be affixed through the labeling machine 10. The cross-feed means or envelope advancing means includes a cross-feed motor 36 connected to drive a sprocket 37 or the like which in turn drives a chain or other suitable power transfer means 38 to drive a roller 39 near the front of the cabinet 29 and immediately beneath the forward edge of labeling machine 10. The cross-feed roller 39 drives an endless belt 40 which is received around an idle roller 41 at the entry end to the labeling machine for engaging and carrying envelopes E or other pieces through the labeling machine. The belt 40 and rollers 39 and 41 cooperate with a series of dancer rolls or idle rollers 42 rotatably supported at their opposite ends in keyhole-shaped slots 43 formed at opposite sides of the housing 26 near the bottom thereof.

Figure 12:
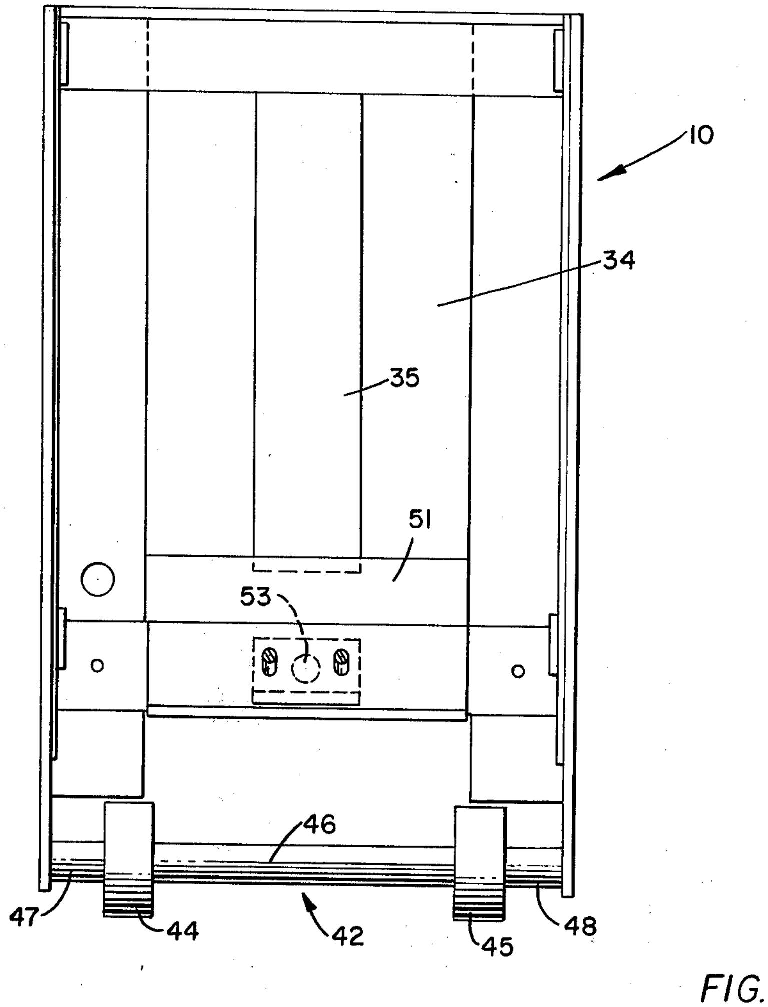
FIG. 12 is a view looking toward the front of the labeling machine of FIG. 1, with portions thereof broken away to show the cross feed rolls therein.
Figure 13:
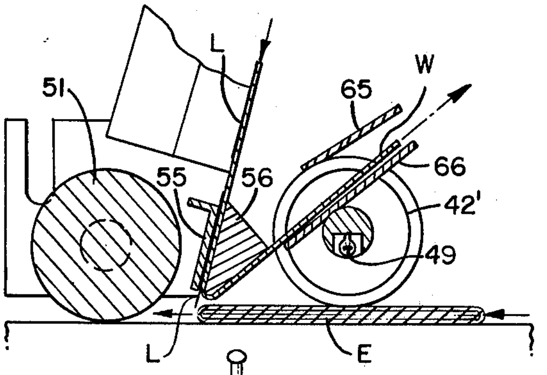
Figure 14:
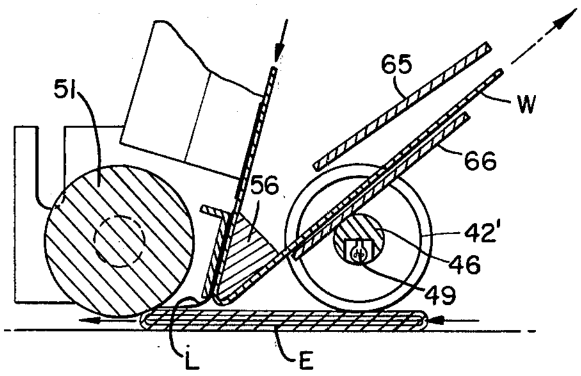
FIG. 14 is a view similar to FIG. 13 with the web and envelope advanced further through the machine and with the label partially attached to the envelope or the like and about to be pressed thereon by the press roll.
Figure 15:
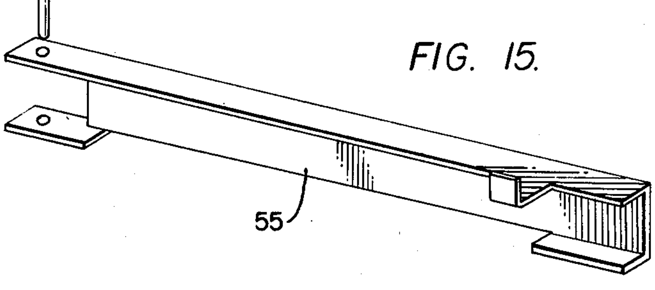
FIG. 15 is an enlarged, perspective view of the web feed gate of the labeling machine of FIG. 1.

As seen best in FIG. 12, the rollers 42 each comprises a pair of disc-shaped wheels 44 and 45 rotatable on an axis or shaft 46 which projects outward at its opposite ends 47 and 48 into the keyhole slots or notches 43. The last roller 42′ in the series of rollers has a light emitting diode or other suitable means 49 in the axle or shaft thereof for cooperation with a sensing means such as photocell 50 to define an envelope sensing means to detect the presence of an envelope or other piece being fed through the machine. A press roll 51 is supported in a pair of keyhole slots or notches 43 at the exit from the labeling machine 10 for pressing a label firmly onto an envelope or other suitable piece as it leaves the label affixing station and exits from the labeling machine 10.

As noted previously, and as seen best in FIGS. 1 and 9, the labels L are carried by a web W and are normally spaced apart a distance or space S. However, during manufacture a label sometimes is separated from the web, thus leaving a large gap or space M. Also, it sometimes occurs that the material is not removed from between two adjacent labels L, resulting in a filled gap or space S′.

The web carrying the labels is fed from the tray 33 down the chute 34 beneath the leaf spring member 35 and behind a cover 52 which covers and protects a light means such as LED or the like 53 near the bottom end of the chute 34, which cooperates with a sensing means such as photocell 54, to define a label sensing means. The photocell detects the difference in density between a label and the space between labels to produce a negative going signal as a label passes from between the light 53 and sensing means 54. The web then continues down behind a movable gate 55 at the lower end of the chute which cooperates with a label stripping bar 56 which has a generally triangular shape in cross section and defines a relatively sharp lower corner about which the web carrying the label turns, and as the web makes the turn around the label stripping bar 56, the labels tend to separate from the web and continue straight down until the lower edge of a label contacts the envelope or other piece being fed through the machine and thus the label is adhesively secured to the envelope or the like and carried with it beneath the press roll 51, where the label is securely pressed and affixed to the envelope or the like. After passing around the label stripping bar 56, the web passes upwardly through a web threading mechanism 57 and between a pair of web feed rolls 58 and 59 to a takeup spool 60.

A label drive motor 61 turns a sprocket 62 which is engaged with a chain or other suitable power transfer means 63 which is engaged with the feed roll 58 to turn it to feed the web to the takeup spool 60. The label drive motor is preferably a shaded pole motor connected to drive the label feed roll 58 through an electromechanical clutch brake. Accordingly, when the power is off, the clutch brake is engaged, stopping the armature very quickly and thus stopping the movement of the takeup spool 60 and of the labels. The takeup spool, in turn, is constantly or continuously driven from a low torque motor 64. When the power is on, the motor 64 operates to rotate the takeup spool and pull the web thereonto. If, however, the web is stopped at the label feed rollers 58 and 59, then the motor 64 is not able to continue rotation of the takeup spool 60.

Figure 16A:
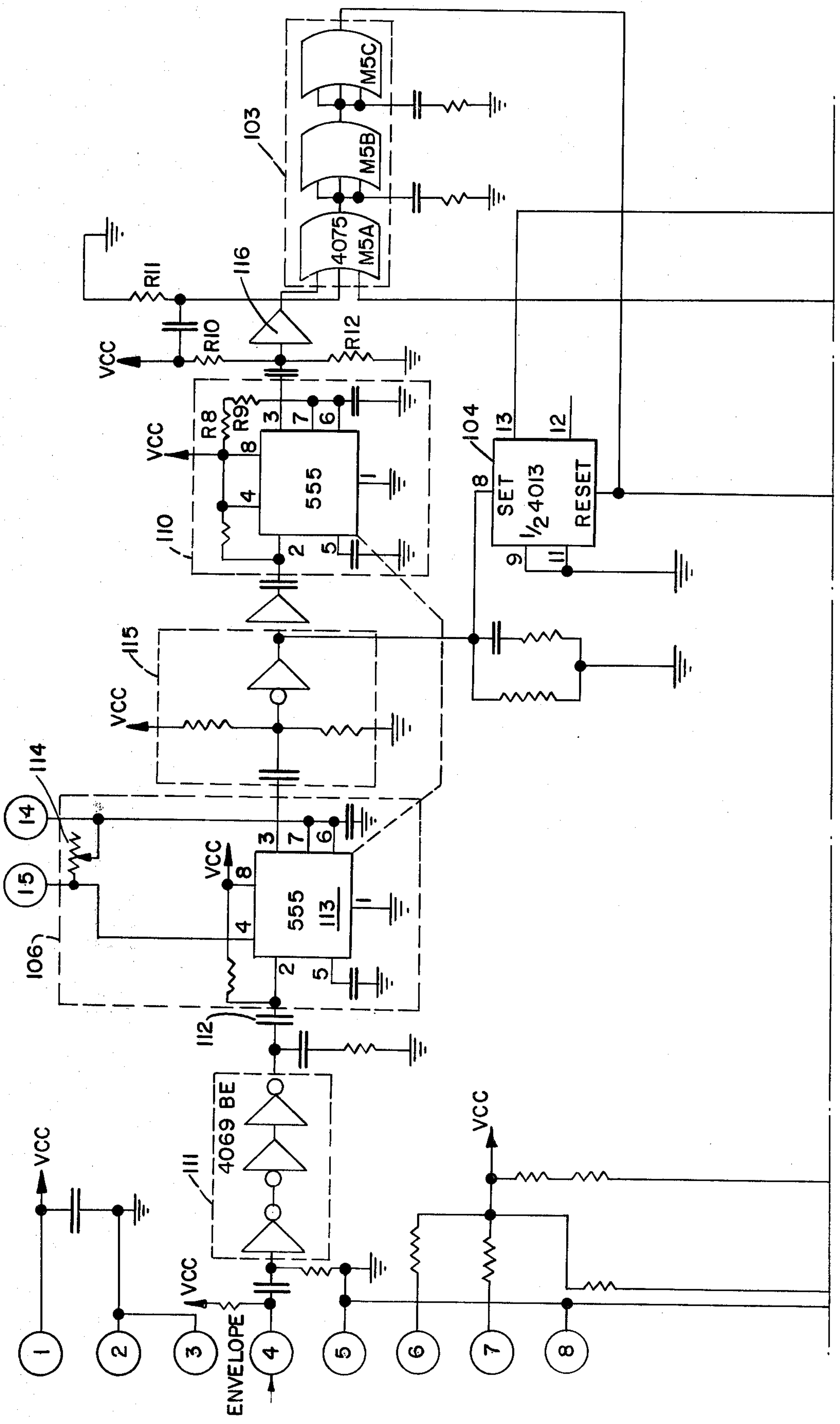
FIG. 16*a* is a schematic diagram of a portion of the electrical circuitry for controlling the operation of the labeling machine of the invention.
Figure 16B:
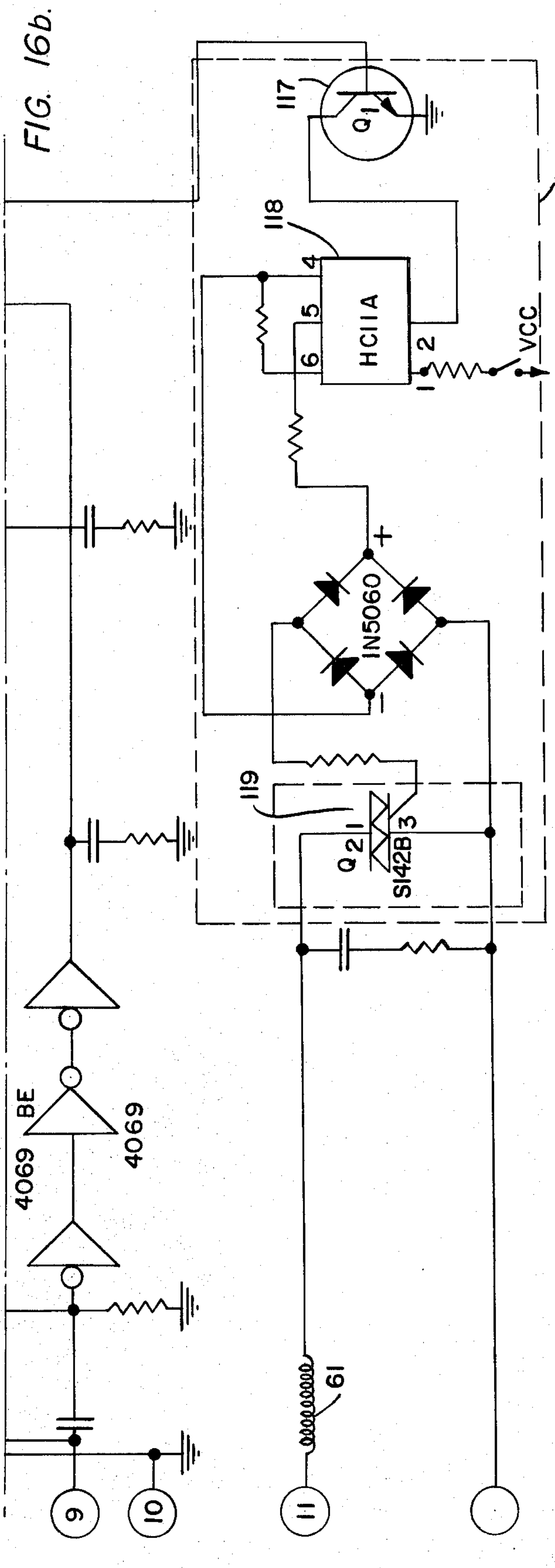
FIG. 16*b* is a schematic diagram of the remainder of the electrical circuitry for controlling operation of the labeling machine of the invention.
Figure 17:
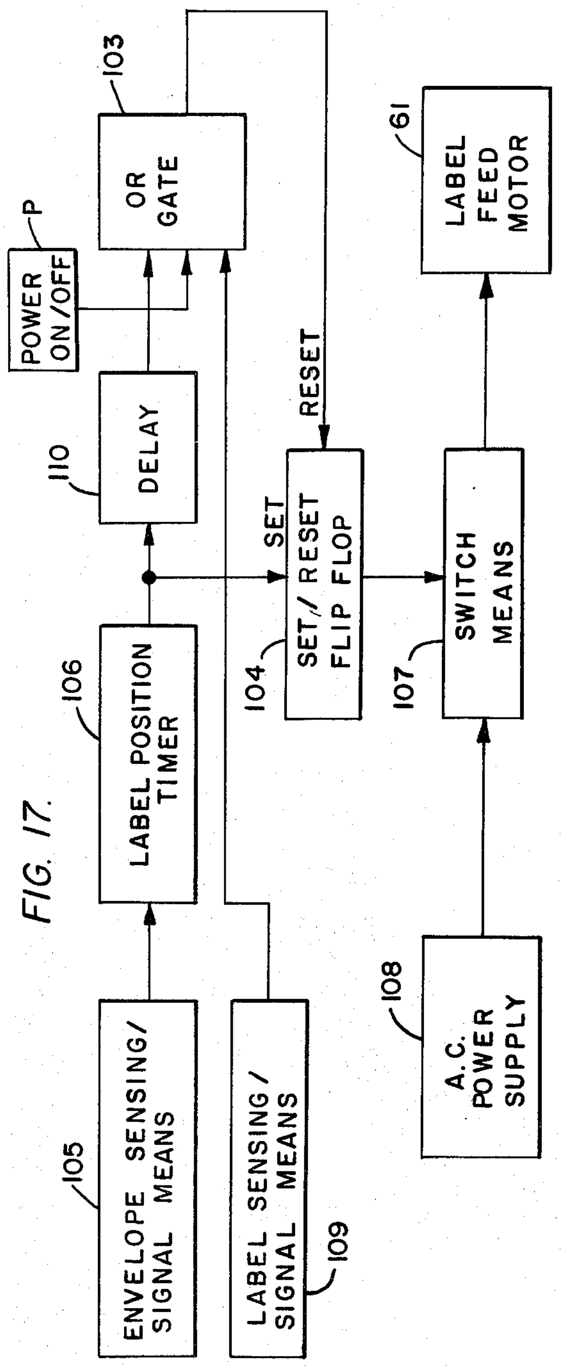
FIG. 17 is a diagrammatic view of the major elements of the control means of the invention.

The label feed means and web threading mechanism 57, 58 and 59 is seen best in FIGS. 3, 4, 5 and 6, and as noted previously, includes feed rolls 58 and 59 of which roll 58 is connected to be driven by a label feed motor 61. The roll 59 is an idler roll which is normally pressed against the feed roll 58 and the web W passes between the rolls 58 and 59, whereby it is advanced toward the takeup spool 60 when the feed roll 58 is caused to be rotated by the label drive motor 61. The envelope sensing means controls operation of the label drive motor 61. Suitable electrical circuitry, as shown, for example, in FIGS. 16*a*, 16*b* and 17, is connected with the LEDs and phototransistors or other suitable sensing means for effecting synchronous operation of the label feed means and the envelope feed means.

To initiate operation of application of labels to envelopes or the like E, the power on switch is operated to turn power on to the machine and a suitable button or switch means (not shown) is operated to initiate feeding of envelopes or the like from the feeder 11. Thus, as the motor 20 is operated in the feeder, the pitman arm 18 is caused to move, operating the shuttle 14 back and forth to feed envelopes or the like from the bottom of the stack in the hopper H to between the feed rolls 21 and 23, which in turn feed the envelope or the like forwardly to between the cross-feed means or rolls 41 and 42 in the label applying machine. The envelope is thus advanced through the label applying machine by cooperation between the belt or the like 40 and the cross-feed rolls 42, until the leading edge of the envelope or the like passes between the LED 49 and its associated phototransistor 50, at which time a signal is generated and sent to the circuitry to effect energization of the label drive motor 61 which begins advancing the web carrying the labels down the chute up through the web threading mechanism 57 and between the label feed rolls 58 and 59 to the takeup spool 60. It should be noted that at the beginning of the operation of the machine, the web carrying the labels is manually advanced until a label is positioned just at the point where it begins to make the turn around the label stripping bar 56, whereby immediately upon movement of the web thereafter, the leading edge of the label is separated from the web and applied to an envelope or the like passing beneath the label stripping bar 56. The LED 53 and phototransistor 54 sense the movement or passing of labels therebetween by detecting the spaces S between adjacent labels L. When a space is detected, a signal is sent to the label drive motor 61 to stop it and stop advancement of the web W through the label feeding means. Thus, upon an envelope or other piece being sensed by the LED 49 and the phototransistor 50, the label feed means is operated to cause advancement of the web carrying the labels a distance sufficient to apply a label to the piece and then the label feed means is stopped until a subsequent piece is sensed, which again causes energization of the label feed means to advance the web carrying the labels to apply a label to the subsequent piece. The control circuitry includes other novel features which insure that accurate registry is obtained between the labels and pieces, and these features will be described in detail hereinafter. It should be noted here, however, that the low torque motor 64 which operates the takeup spool 60 maintains proper tension on the web W and winds up the web W a distance corresponding to the space of one label each time the label feed means is operated.

Figure 4:
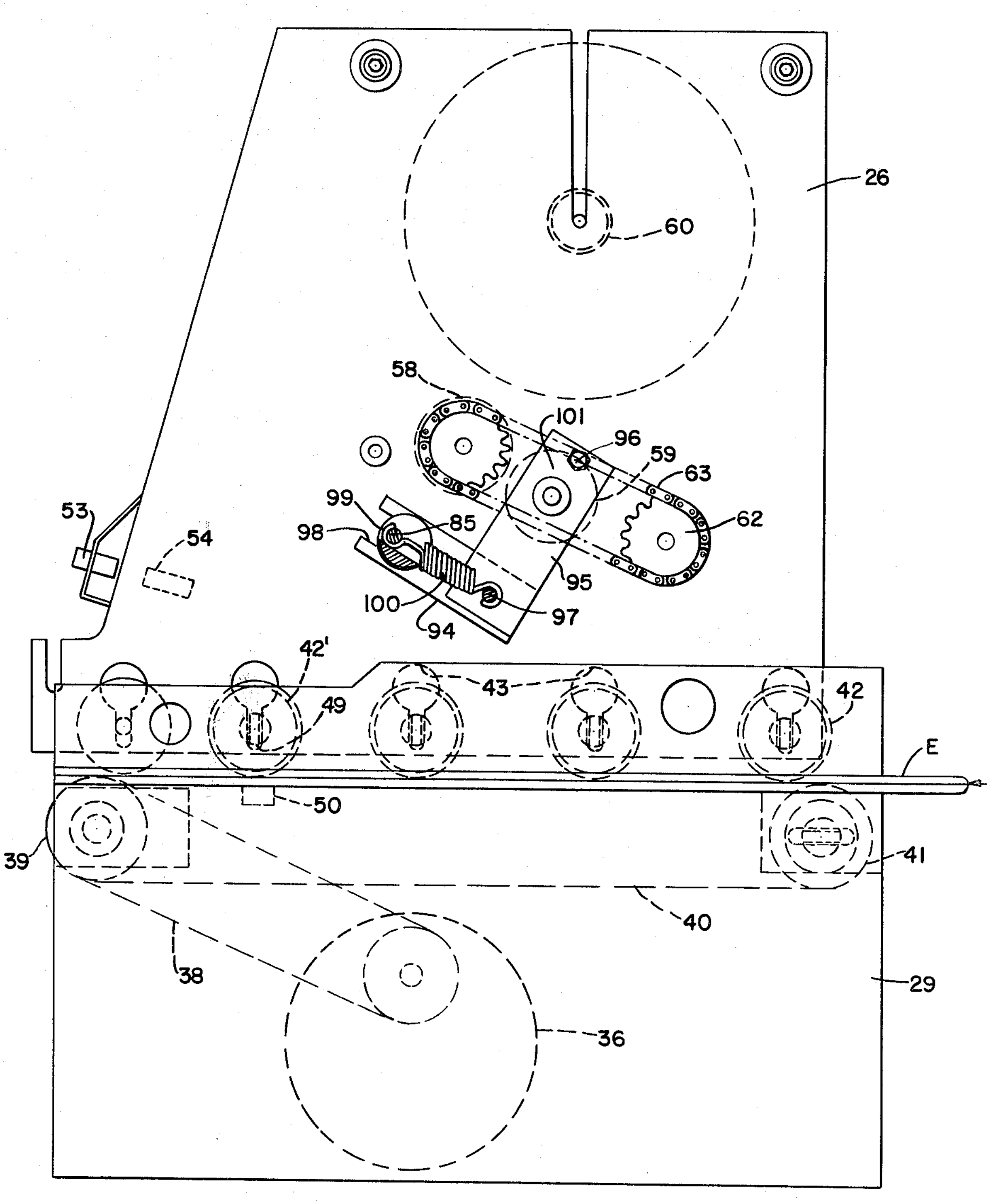
FIG. 4 is a view similar to FIG. 3, with the labeling machine shown in section.

The web threading mechanism 57 comprises a pair of plates 65 and 66 secured together by means of screws or the like 67 extended through opposite ends of a bar 68 which is permanently affixed, as by welding or the like, to the top surface of plate 65 and into spacer blocks 69 permanently secured to the top surface of plate 66. The plate 66 is substantially planar and has a pair of downturned flanges 70 and 71 on its opposite edges, each having a pair of elongated slots 72 and 73 therein. The plate 65, on the other hand, is deflected or bent upwardly adjacent the bar 68 to define a throat 74 with the plate 66 into and through which the web W passes. The plate 66 thus has a portion thereof which is adapted to extend beyond a label stripping means when the plates are in a web threading position to thereby guide and facilitate introduction of the web to the throat defined between the plates and thus facilitate threading of the web between the plates and to a take up means. An actuating bracket or plate 75 is suitably secured to the top surface of the upwardly deflected portion of plate 65 and has a pair of upstanding flanges 76 and 77 on its opposite side edges with elongate slots 78 formed therein. An actuating linkage 79 for actuating the threading mechanism includes a pair of substantially parallel side bars or plates 80 and 81 having a rod or pin 82 connected at its opposite ends adjacent one of the ends of the side plates and extending through the slots 78 in the upturned flanges 76 and 77 carried by the bracket or plate on the top surface of plate 65. The side bars or plates 80 and 81 have cutouts 83 and 84 in their lower edges for clearance of a pivot pin or rod 85 which extends between opposite sides of the frame 26 of the label applying machine 10. Relatively short pivot links 86 are fixedly carried by the pivot rod 85 for rotation therewith and a connecting pin 87 is secured to the ends of the links 86 opposite the pivot rod 85 and extends between the side plates or bars 80 and 81 at opposite sides of the linkage assembly 79. The pivot rod 85 extends outwardly beyond the sides of the frame 26 and a control knob 88 is fixed on one end thereof for causing rotation of the rod 85 and thus of the links 86 to effect to-and-fro movement of the linkage assembly 79 between its extreme positions as seen in FIG. 4 and FIG. 5, respectively.

The plates 65 and 66 are caused to move in a straight line reciprocatory movement by guide pins 89 and 90 fixed to the sides of the frame 26 and extended into the slots 72. An elongate guide pin or rod 91 is also affixed at its opposite ends to the sides of the frame 26 and extends through the slots 73, thus insuring that reciprocating motion of the plate 66 will be in a plane defined by the plane of the guide pins 89, 90 and 91. A coil spring 92 is engaged at one end on a short pin 93 fixed to the underside of plate 66 and at its other end on the guide rod 91, whereby the spring normally tends to hold the plate 66 to the right as viewed in the drawings, with the guide pins 89, 90 and 91 engaged against the left-hand end of the slots 72 and 73.

Figure 5:
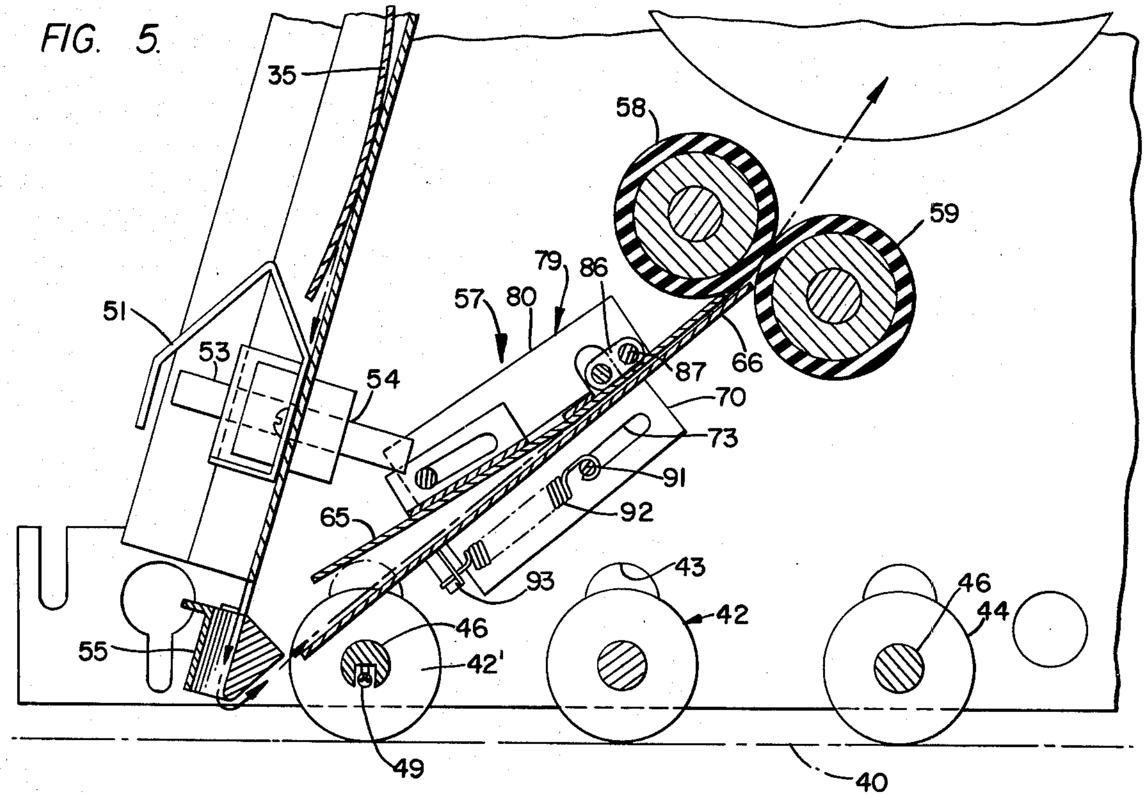
FIG. 5 is a fragmentary view in section of a portion of the labeler of FIG. 4.
Figure 6:
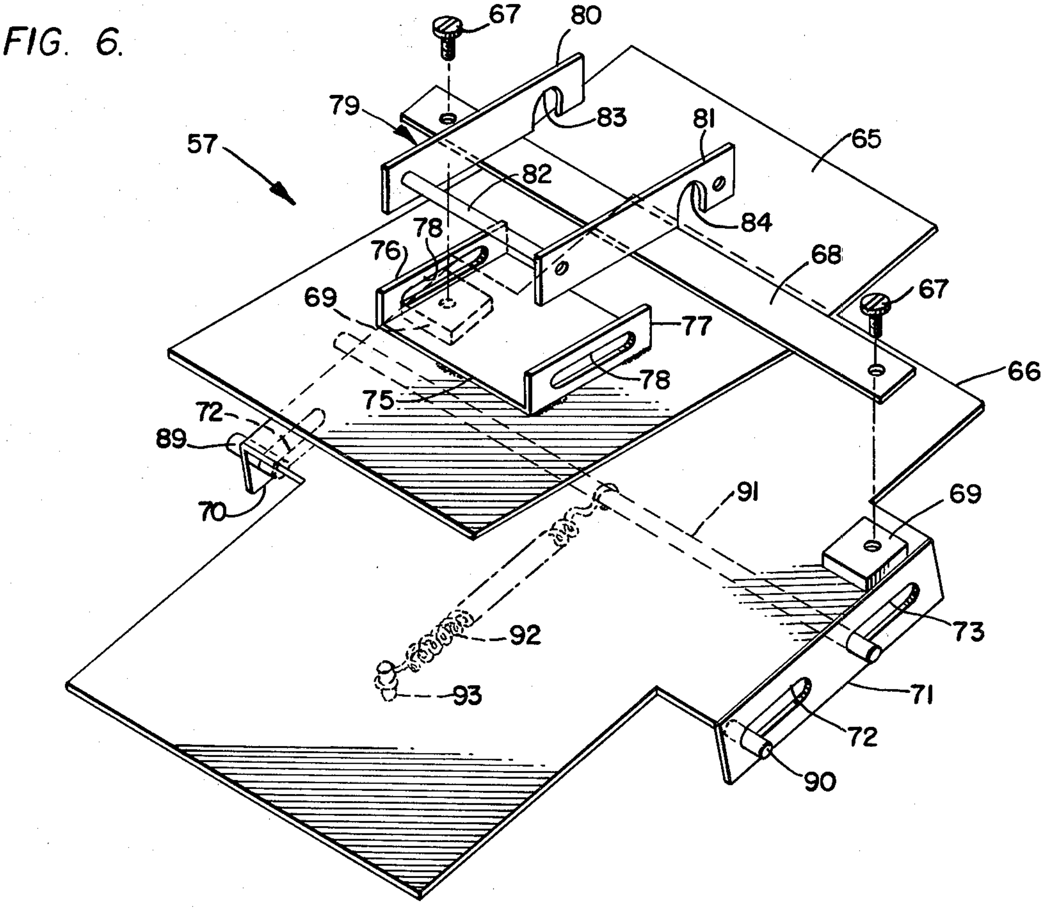
FIG. 6 is an enlarged, perspective, exploded view of the web feed throat or threading means of the labeler of FIG. 1.
Figure 8:
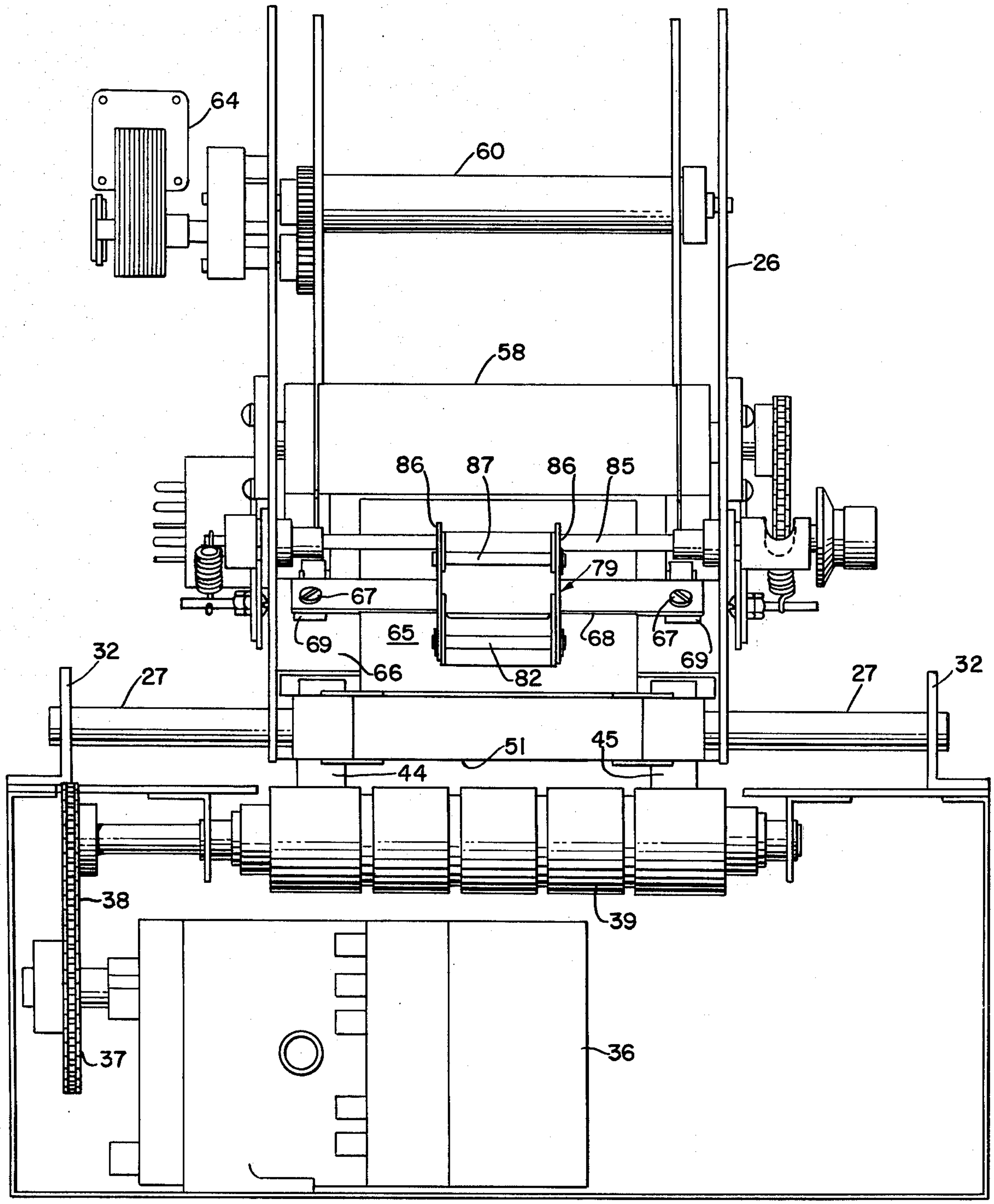
FIG. 8 is an enlarged view in elevation from the front of the labeling machine of FIG. 1, with the housing or cover removed for clarity.
Figure 10:
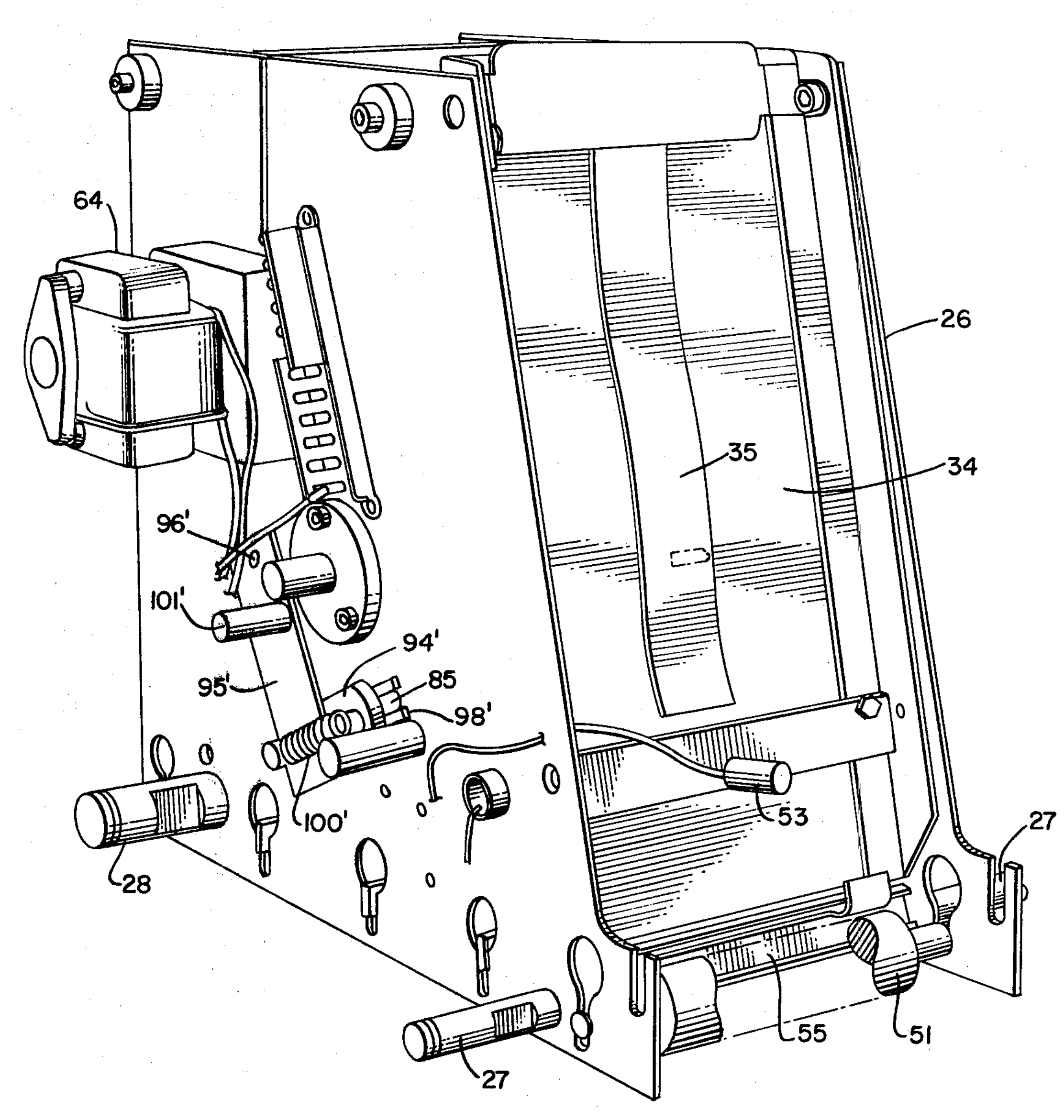
FIG. 10 is a view similar to FIG. 7, except looking toward the other side of the labeling machine.

In this position, which is the normal operative position, the threading mechanism 57 assumes the position shown in FIG. 5, and the knob 88 is turned in a clockwise direction to pivot the links 86 in a clockwise direction to cause the bar 82 of linkage 79 to tend to move away from the left-hand end of slots 78 and thus enable the plates 65 and 66 to move to the right under the bias of spring 92. On the other hand, when it is desired to feed a web W into the mechanism in order to place it in operative position on the takeup spool 60, the knob 88 is rotated in a counterclockwise direction, which in turn causes counterclockwise rotation or pivoting of the links 86 with the result that the linkage 79 moves to the left to the position shown in FIG. 4 to push the plates 65 and 66 to the left against the bias of spring 92, as shown in FIG. 4.

Figure 3:
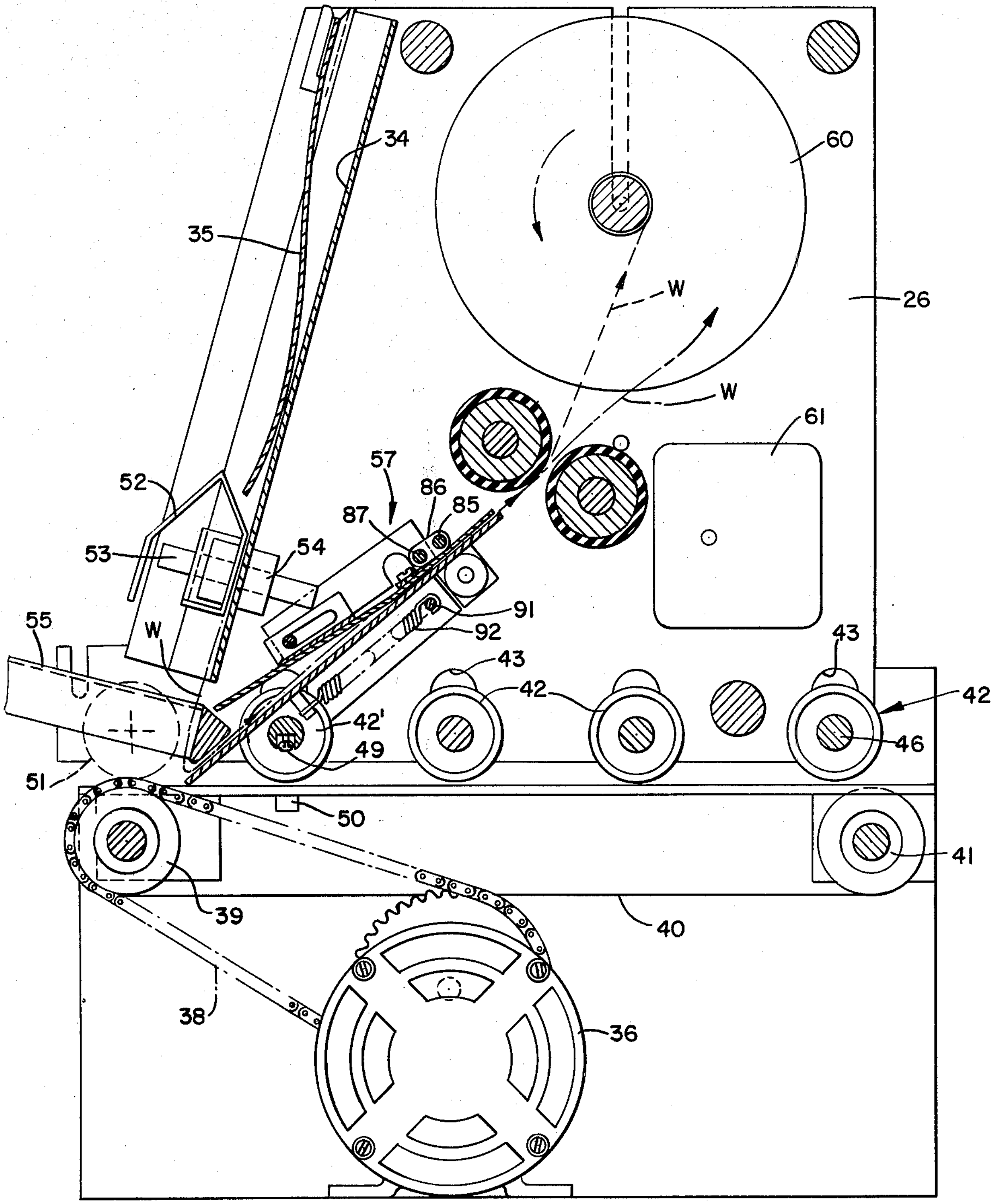
FIG. 3 is an enlarged view in elevation, with the housing or cover removed, of the labeler of FIG. 1.
Figure 11:
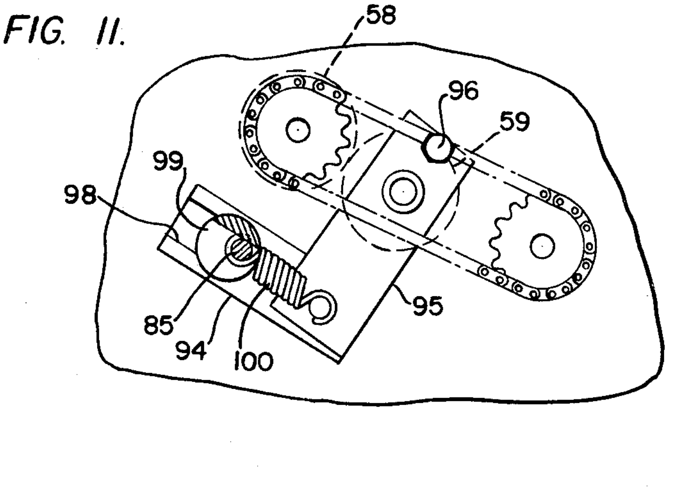
FIG. 11 is an enlarged, fragmentary view of the linkage for controlling the positioning of the web throat or threading means of the labeling machine of FIG. 1.

In order to move the feed roll 59 away from the feed roll 58 to enable threading of the web W therebetween, a pair of links 94 and 95 are arranged on the outside of frame 26 and are operated at the same time as the linkage 79 is operated. Thus, as seen best in FIGS. 3, 7 and 11, the link 95 is pivotally connected at one end thereof at 96 to the frame and is pivotally interconnected at its other end by a pin 97 with one end of the link 94. The other end of the link 94 is bifurcated at 98 and the bifurcated end is received over and cooperates with an eccentric cam member or surface 99 arranged to be rotated at the same time the knob 88 and pivot rod 85 are rotated, whereby the link 94 is caused to move against the bias of a spring 100 which is connected at one end to the pivot rod 85 and at its other end to the pin 97. The axis 101 of feed roll 59 is pivotally carried by the link 95 between the ends thereof, whereby when the knob 88 is rotated in a clockwise direction, the eccentric 99 acts against the bifurcated end 98 of link 94 to cause the link 94 to move to the right as viewed in FIG. 3, thus causing link 95 to pivot counterclockwise about pivot 96 and moving feed roll 59 away from feed roll 58, as seen in FIGS. 3 and 4. On the other hand, when the knob 88 is rotated counterclockwise, the eccentric 99 enables the bifurcated end 98 to move to the left, as viewed in FIG. 11, for example, whereby the link 95 pivots clockwise about pivot 96 enabling the feed roll 59 to move back into contact with feed roll 58. Similar and corresponding linkage with the reference numerals primed is mounted on the opposite side of the frame 26. A knob 102 may also be provided on the axis or shaft 101 for feed roll 59 to rotate the feed roll during threading of a web therebetween to facilitate advancement of the web toward the takeup spool 60.

The electronic control means for the apparatus of the invention is illustrated in FIGS. 16*a*, 16*b* and 17, and referring first to FIG. 17, a power on/off switch means P is provided which when activated applies a positive pulse to an OR gate 103 which in turn sends a reset signal to a flip-flop 104. At this time feeding of envelopes or other mail pieces from the feeder 11 is also initiated and when the envelope or other mail piece intersects the envelope sensing/signal means 105 comprising LED 49 and phototransistor 50, a signal is sent to the label position timer circuitry, which introduces a predetermined delay to the signal and then supplies the delayed signal to the flip-flop 104 to set the flip-flop and energize switch means 107, whereby power from the AC power supply 108 is supplied to the label feed motor 61 to advance the web W and labels a distance of one label, thereby applying a label to the mail piece. As the web carrying the labels is advanced by the label drive motor, a label passes the label sensing/signal means 109 comprising the LED 53 and phototransistor 54 and a signal is produced which is supplied to the OR gate 103 and in turn supplied by the OR gate as a reset signal to the flip-flop 104, resetting the flip-flop, deenergizing the switch means and stopping the label feed motor 61, whereby the label feed is accomplished in a stepped or incremental manner in accurately indexed relationship relative to the feed of the envelopes or other mail pieces or the like.

In addition to the reset signal produced by the label sensing signal means, a redundant delay 110 is provided which takes the signal from the label position timer 106 and further delays the signal by a predetermined amount, as, for example, 25 milliseconds or the like, and applies this further delayed signal to the OR gate 103, whereby a reset signal is supplied to the flip-flop 104 to reset it and deenergize the label feed motor 61 after a predetermined time interval, whereby in the event a label is missing from the web, as indicated at M in FIG. 9, the label feed motor will not continue to run and the label feed will continue to be accomplished in an incremental stepped manner with the label positions accurately indexed relative to the envelope or other mail piece positions. Of course, the mail piece which passes beneath the label affixing station at the time the missing label on the web passes that point will not have a label applied thereto, but the labels will be accurately applied to subsequent mail pieces.

Referring now to FIGS. 16*a* and 16*b*, the circuitry will be described in more detail, and the signal or positive pulse from the envelope sensing means is supplied to an inverter amplifier circuit 111 and the positive pulse is inverted and applied through coupling capacitor 112 as a negative pulse to label position timer or delay gate 106. The label position timer 106 includes a 555 integrated circuit chip 113 with an adjustable delay achieved by potentiometer 114. The output of the timer 106 is differentiated and the trailing edge of the pulse inverted and shaped in pulse shaping network 115 and the delayed positive pulse thereby obtained is supplied to the set terminal or pin 8 of flip-flop 104. The inverted, shaped and delayed signal from pulse shaping network 115 is also supplied to the delay circuit 110, the time of delay of which is determined or adjustable by resistors R8 and R9. The period of delay set or provided by this circuit is slightly longer than the time taken to normally drive a label past the label sensing means 109 on the label feed chute. The output from the redundant delay 110 is differentiated and the trailing edge processed or shaped in amplifier 116 and applied to OR gate 103.

The shaped pulse from pulse shaping network 115 applied to the set terminal of flip-flop 104 turns the flip-flop on and the signal is amplified and inverted in transistor 117 and the resulting signal applied to optical coupler 118, which in turn triggers a triac 119 to enable flow of current to label drive motor 61. Upon energization of the label drive motor, the web carrying the labels is advanced and when the label sensing means 109 detects passage of a label therepast, a positive pulse is produced, amplified and shaped and supplied to OR gate 103.

Assuming normal operation of the system when the power is turned on to the label applying machine, a pulse is applied to the OR gate as previously described and this pulse is in turn applied to the reset terminal of flip-flop 104. Thereafter, as the envelope intersects the envelope sensing means, the resulting signal is delayed by an adjustable predetermined amount and applied to the set terminal of flip-flop 104, thereby enabling the switch means 107 and effecting energization of the label feed motor 61 to advance the labels through the machine. When the label sensing means 109 detects a label, it applies a pulse to the OR gate 103, which in turn supplies a reset pulse to the flip-flop 104, operating the switch means 107 and disabling label feed motor 61. Conversely, if a label is missing from the label carrying web such that a signal would not be produced by the label sensing means, or if the normally present space between adjacent labels is filled by excess label material, then the label sensing means will not operate to cause a reset pulse to deenergize the label drive motor. In this event, the redundant delay 110 serves to produce a pulse delayed by a predetermined amount following the set pulse from delay 106 and this redundant delay pulse is supplied to the OR gate, which in turn applies a reset pulse to the flip-flop 104, to effect deenergization of the label feed motor 61 after a finite predetermined time.

Therefore, three separate positive pulses are applied to the OR gate in order to obtain a reset pulse to cause deenergization of the label feed motor. As noted previously, one of these pulses results from turning the label applying machine on, another pulse results from sensing passage of a label down the label feed chute, and another pulse results from the redundant delay which is a safety feature to insure that proper indexing of the labels and envelopes or other mail pieces is obtained even if a label is missing from the web or if a space which would normally be present between adjacent labels is filled by excess material or the like. Additionally, with the redundant delay feature, the label applying machine will accurately function to apply the last three labels from a web at the end of a labeling run.

Additionally, the potentiometer 114 in the label position circuit enables the operator to select or adjust the position of the label on the mail piece and during operation, the labeling machine is capable of applying about 8,000 labels per hour to pieces such as No. 10 envelopes or the like, with a position accuracy of about plus or minus ⅛ of an inch.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A machine for applying labels to envelopes and the like, comprising: a frame having upstanding, generally parallel side walls and defining a bottom, a top, a front and a back; a label affixing station at the bottom of the machine near the front; envelope feed means at the bottom for feeding an envelope or the like through the machine and past the label affixing station; label storage means at the top of the machine for storing a plurality of labels on a carrier web; label feed chute means at the front of the machine; label feed means for moving the web and thus the labels down the chute means and past the label affixing station; label stripping means at the label affixing station for separating labels from the web; and electronic control means for controlling feed of envelopes and labels past the label affixing station whereby accurate registry between the labels and envelopes is obtained, said control means including switch means connecting said label feed means to a power supply, switch control means controlling said switch means, reset means connected to said switch control means to cause said switch control means to actuate/-deactuate said label feed means; envelope sensing means for sensing the approach of an envelope or the like to the label affixing station and operative to initiate feeding of labels, label sensing means for sensing movement of the labels toward the label affixing station, said label sensing means being connected to said switch reset means to operate said switch control means to terminate feeding of labels after a label has been advanced for application to an envelope or the like, a label position timer connected to said envelope sensing means, delay means associated with said label position timer for delaying a signal produced by said label sensing means, and redundant delay means connecting said label position timer to said switch control reset means for further delaying a signal produced by said label position timer a predetermined time, said further delayed signal being supplied to said reset means to reset said switch means after said predetermined time whether or not a label has been sensed by said label sensing means, said reset means being controlled via both said label sensing signal means and said redundant delay means to terminate the feeding of labels after a predetermined time even if advancement of a label is not actually sensed by said label sensing means.

2. In an apparatus for applying labels to envelopes and the like, including: an envelope signal means; a label applying machine with storage means for storing a carrier web having a plurality of labels temporarily affixed thereto; label feed means for feeding the web and thus the labels from the storage means and having a switch means connecting the label feed means to a power supply; a reset means connected to the switch means to control that switch means; a label feed chute along which the web and labels carried thereby are fed from the storage means; a label stripping means for stripping labels from the web as the web and labels leave the chute; a label position timer signal means; a label affixing station at which labels stripped from the web are affixed to envelopes and the like as the envelopes and the like move past the label affixing station; and envelope feed means for feeding envelopes and the like past the label affixing station; a label position timer connected to the envelope sensing means and having means for introducing a predetermined delay to a signal produced by the envelope signal means; the improvement comprising electronic control means for sensing advancement of labels and envelopes and the like and operative to regulate feed of labels responsive to feed of envelopes, and including redundant electronic delay means connecting the label position timer to the reset means and operative to further delay a signal from the label position timer a predetermined amount to terminate advancement of labels after a predetermined time when advancement of a label has not actually been sensed, thus maintaining accurate registry between labels and envelopes and the like even in those instances when labels are irregularly applied to the web.

3. In a machine for applying labels to envelopes and the like, wherein the machine has storage means for storing a carrier web having a plurality of labels temporarily affixed thereto, a label affixing station, means for feeding envelopes and the like past the label affixing station, means for feeding the web and labels past the label affixing station, label stripping means at the label affixing station for stripping labels from the web for application of the labels to the envelopes and the like, and web take-up means for collecting and storing the web after the labels have been removed therefrom, the improvement comprising web threading means for threading the web in the machine between the storage means and take-up means, the threading means including a pair of spaced apart, shiftable plates defining a throat therebetween through which the web passes from the label affixing station to the take-up means, web feed rolls between the plates and the take-up means, said feed rolls being separable to enable threading of the web therebetween, and a single, externally operable control knob connected with the plates and feed rolls to shift the plates and separate the feed rolls to facilitate threading of the web between the plates and between the rolls to the take-up means.

4. The apparatus defined in claim 1 further including feed means for feeding workpieces to a workstation, comprising: a housing having a supply hopper on a top portion thereof for storing workpieces and including a gate member engageable with an edge of the workpieces to prevent lateral movement thereof from the hopper; a hollow, vacuum shuttle means reciprocable to and fro beneath the hopper and having an upper surface disposed beneath the hopper in one operative position of the shuttle means and disposed laterally to one side of the hopper beyond the gate means in another operative position of the shuttle means; a source of vacuum connected with the shuttle means to produce a vacuum therein; said upper surface of the shuttle means having a plurality of apertures therein for communicating the vacuum to the bottommost workpiece in the hopper means and drawing that workpiece downwardly below the gate means and onto the shuttle means when the shuttle means is in the said one operative position for movement with the shuttle means to its said another operative position; and workpiece engaging means positioned to intercept and engage the workpiece at said another position of the shuttle means and operative to strip the workpiece from the shuttle means against the influence of the vacuum therein and to advance the workpiece toward the work station.

5. A machine as in claim 1, including web take-up means for storing the web after the labels have been removed therefrom, and threading means for threading the web from the label stripping means to the web take-up means, said threading means comprising a pair of plates mounted for to and fro movement adjacent the label stripping means and between the label stripping means and web take-up means, said plates having divergent portions defining a throat through which the web passes, linkage means connected with the plates for moving them toward and away from the label stripping means and a single control knob accessible externally of the machine for manipulating the linkage to move the plates into and out of web threading position, one of said plates having an edge portion thereof extended beyond the label stripping means when the plates are in the web threading position to thereby guide and facilitate introduction of the web to the throat defined between the plates and thus facilitate threading of the web between the plates and to the take-up means.

6. A machine as in claim 5, wherein the label feed means comprises a pair of rolls positioned between the web threading means and web take-up means and said rolls normally engaged against opposite sides of the web to advance the web and thus the labels through the machine, said linkage including means connected with said rolls for separating the rolls in enable insertion of the web therebetween when the knob is manipulated.

7. A machine as in claim 6, wherein the electronic control means is operative to energize the label feed means when advancement of an envelope and the like toward the label affixing station is sensed by the envelope sensing means and operative to deenergize the label feed means when passage of a label past the label sensing means is sensed, said label feed means thus operating incrementally in steps equivalent to the width of a label, said label sensing means and envelope sensing means each comprising a light source and light sensitive means between which the web carrying the labels and the envelopes pass, respectively, and said predetermined time delay caused by said redundant delay means being approximately equal to an amount of time slightly longer than that normally taken to drive a label past the label sensing means.

8. A machine as in claim 7, wherein the envelope feed means comprises a plurality of rolls operatively associated with a belt for advancing the envelopes between the rolls and belt toward the label affixing station and feeder means for feeding envelopes to the label applying machine including a hopper in which envelopes are placed, said hopper having a front wall defining a gate engaged against an edge of the envelopes to prevent lateral movement of the envelopes from the hopper toward the label applying machine, a hollow vacuum shuttle having one position beneath the hopper, a source of vacuum connected with the shuttle, said shuttle having an upper surface with a plurality of apertures therein for communicating the vacuum with the bottommost envelope in the stack of envelopes in the hopper, envelope gripping means disposed between the hopper and the label applying machine in a position to intercept and grip an envelope on the shuttle when the shuttle is in a second position, and means connected with the shuttle for moving it to its second position with the bottommost envelope in the hopper drawn onto the shuttle and carried therewith into engagement with the envelope gripping means which then strip the envelope from the shuttle against the vacuum therein and advance it into the label applying machine.

9. A machine as in claim 8, wherein the label stripping means comprises a bar having a generally triangular shape in cross section positioned at the bottom of the label feed chute and adjacent the entrance end of the web threading means, said bar thus presenting a relatively sharp edge around which the web passes as it leaves the chute and extends toward the take-up means, whereby labels carried by the web are separated from the web and continue downwardly past the bar into engagement with an envelope passing therebeneath, and press roll means disposed after the label affixing station for pressing a label onto an envelope as it leaves the label applying machine.

* * * * *